Patented Nov. 2, 1937

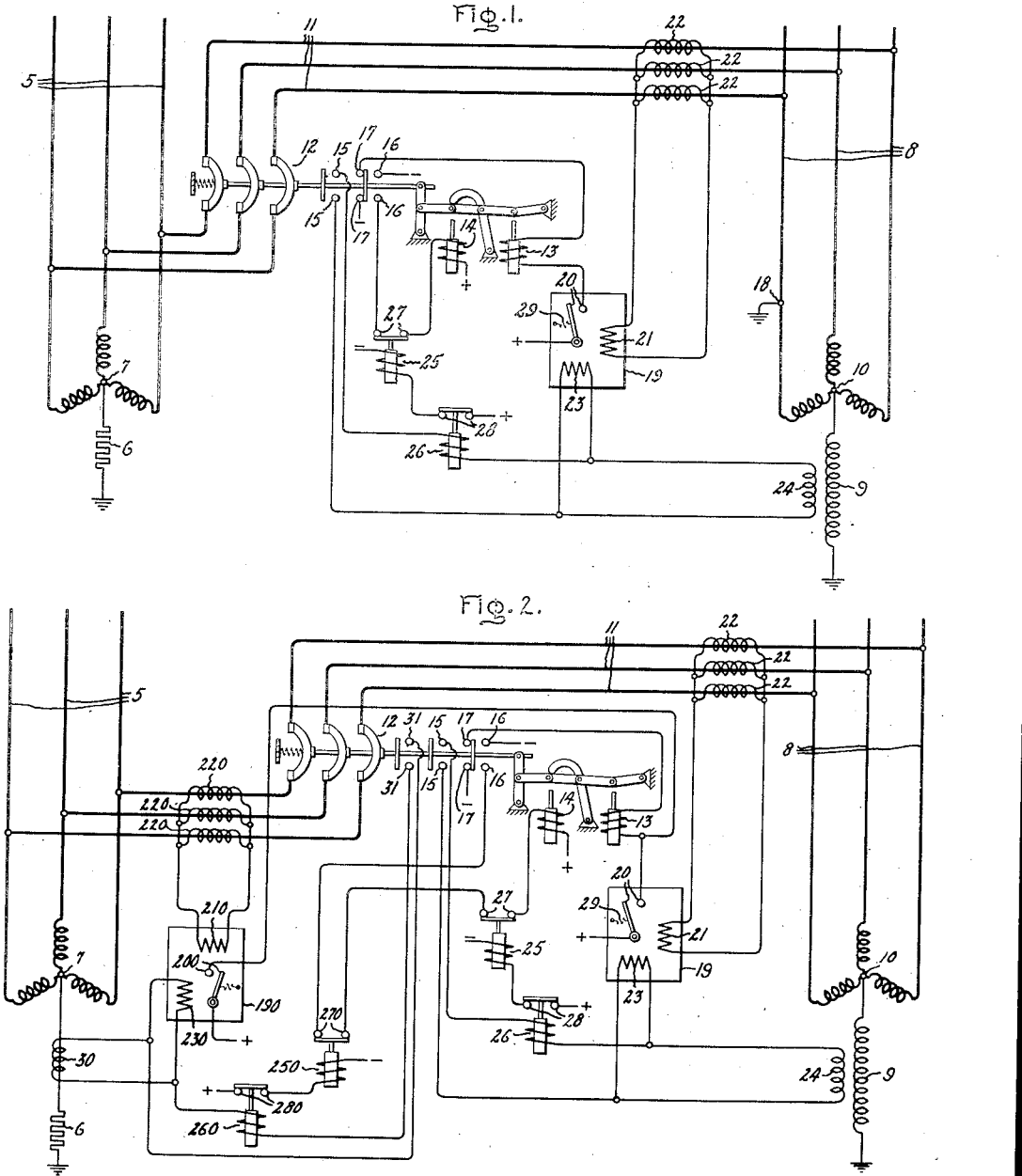

2,098,035

UNITED STATES PATENT OFFICE 2,098,035

PROTECTION OF ELECTRIC SYSTEMS

Komao Fukushima, Tokyo, Japan, assignor to General Electric Company, a corporation of New York Application October 20, 1936, Serial No. 106,704
In Japan December 7, 1935

7 Claims. (Cl. 175—294)

My invention relates to improvements in the protection of electric systems and more particularly to interconnected electric systems which have grounded neutrals and which embody current limiting devices presenting different forms or magnitudes of impedance to ground fault current, whereby to provide a protective arrangement which insures the intended and proper operation of the current limiting devices.

It is desirable to interconnect electric power systems by tie lines for exchange of power. However, if the systems so connected have grounded neutrals and are equipped with different current limiting devices for ground fault protection, then the current limiting devices, which may be in the neutral to ground connection, may be prevented from performing their proper fuctions. Thus, if a power system equipped with an arc suppressing reactance type grounding device, such as disclosed, for example, in United States Letters Patent 1,537,371, issued May 12, 1925, and a power system equipped with a resistance type grounding device are interconnected by a tie line, then in case of a ground fault on the first system, there will flow at the grounded point, together with the arc suppressing current due to said reactance earthing device, zero phase sequence or ground fault current through the tie line from the second system. Since the ground fault current from the second system is substantially an inphase current, whereas the reactance earthing device of the first system is designed to provide a substantially quadrature lagging current to neutralize the charging current to ground of the first system, it is obvious that the proper functioning of the earthing reactance device is prevented. This will be apparent because this device is not designed to extinguish an inphase current arc. Accordingly, the arc may persist at the grounded point with attendant danger to both systems. While it may be possible to eliminate such trouble by inserting an insulating transformer in the tie line between the two systems, the magnitude of power exchange would be limited by the capacity of the transformer. Obviously, this would be a costly expedient, particularly in such cases as involve large exchange of power and especially so, if at high voltages.

In accordance with my invention, I provide an arrangement for eliminating the aforesaid disadvantages so that when a plurality of systems equipped with different ground fault current limiting devices are interconnected by a tie line, this line may be automatically rendered nonconductive on the occurrence of a ground fault on one system whereby the proper functioning of the current limiting devices is not hindered. Further in accordance with my invention, I provide means for rendering the tie line conductive when the ground fault disappears. These and other objects of my invention will appear in more detail hereinafter.

My invention will be better understood from the following description when considered in connection with the accompanying sheet of drawings, and its scope will be pointed out in the appended claims.

In the accompanying drawing, Fig. 1 illustrates diagrammatically an embodiment of my invention as applied to a tie line between two different systems, and Fig. 2 illustrates a modification of the embodiment of my invention shown in Fig. 1.

In Fig. 1, a transmission system 5 is illustrated as provided with a resistance type ground fault current limiting device 6 which may be connected between a neutral 7 and ground as shown. The neutral 7 may in some cases be grounded directly or through other suitable current limiting means, as is well-known to the art. Another transmission system 8 is illustrated as provided with a ground fault current limiting device 9 of the arc suppressing reactance type which may be connected between a neutral 10 and ground as shown. The systems 5 and 8 are interconnected through a tie line 11 for exchange of power.

In order to prevent such exchange of power under predetermined conditions, the tie line is provided with suitable means such as a circuit breaker 12 for rendering the tie line nonconductive. As shown, the circuit breaker 12 is of a latch-closed, trip-free type, and is provided with a trip coil 13, a closing coil 14, auxiliary switch contacts 15 and 16, which are closed when the circuit breaker is open and vice versa, and auxiliary switch contacts 17 which are closed when the circuit breaker is closed and open when the circuit breaker is open. If the systems 5 and 8 are interconnected; that is, the circuit breaker 12 is closed when a ground fault occurs on system 8 as indicated at 18, then, because of the reactance device 9, arc-suppressing lagging current will flow through the grounded point 18 to suppress the ground arc due to the earth fault charging current. In addition, there will flow to the grounded point 18 in the system 8 through the tie line 11 and the neutral resistance 6 zero phase sequence or ground fault substantially inphase current. Consequently, the arc suppressing ability of the reactance device 9 would in effect be lost because the inphase ground fault current from system 5 would tend to maintain the arc.

In accordance with my invention, I eliminate this trouble by means responsive to a ground fault on the system 8 accompanied by ground fault power flow from the system 5 through the tie line 11 to the system 8 for rendering the tie line 11 nonconductive. As shown, this means includes a directional relay 19 which is arranged through its contacts 20 and the auxiliary circuit breaker contacts 17 to complete the circuit of the trip coil 13 when ground fault power flows from the system 5 through the tie line 11 to the system 8. The relay 19 has a current winding 21 which is connected to be energized in accordance with the zero phase sequence or ground fault current in the tie line 11 through suitable means such as current transformers 22 connected in the tie line conductors and having their secondaries connected in parallel as shown. The voltage or polarizing winding 23 of the relay 19 may be connected to be energized from a secondary winding 24 inductively associated with the reactance device 9 or in any other suitable way, examples of which are well known to the art.

Since it may be desirable after the reactance device 9 has accomplished the suppression of the arc at the grounded point on the system 8 to re-establish the conductivity of the tie line 11, I provide means for effecting the closing of the circuit breaker 12 after the disappearance of the ground fault on the system 8. As shown, this means includes a circuit closing auxiliary relay 25 and a circuit opening auxiliary relay 26, which are arranged to control the energization of the closing coil 14 so that this coil may be energized when the circuit breaker is open, provided there is no ground fault current flow in the reactance device 9. For this purpose, the contacts 27 of the relay 25 are arranged in series with the closing coil 14 of the circuit breaker auxiliary switch contacts 16, and the contacts 28 of the relay 26 are arranged in series in the circuit of the energizing winding of the auxiliary relay 25.

When conditions on the system 8 are normal, that is to say, there is no ground fault on this system, no voltage will appear across the secondary winding 24 of the reactance device 9, and the sum of the secondary currents of the zero phase sequence current in the tie line 11 is zero. Consequently, the contacts 20 of the directional relay 19 will be maintained open by any suitable means such as the spring 29 and the circuit breaker will not be tripped. The winding of the auxiliary relay 26 will likewise not be energized, and accordingly its contacts 28 will remain closed to keep the relay 25 energized with its contacts 27 closed.

If now a ground fault occurs as indicated at point 18 on the system 8, arc-suppressing lagging current will flow in the reactance device 9 and the secondary winding 24 thereof will be energized to energize the winding 23 of the directional relay 19. At the same time, current proportional to the ground fault current in the tie line 11 will appear in the directional relay winding 21 as a result of the flow of ground fault current from system 5 to system 8 through the tie line 11 and return by way of the grounding resistance 6. In consequence, the directional relay 19 closes its contacts 20 to trip the circuit breaker 12. Upon the closing of the circuit breaker auxiliary switch contacts 15, the auxiliary relay 26 will be energized to de-energize the auxiliary relay 26 and open the contacts of this relay and keep them open as long as any voltage appears across the secondary winding 24 of the reactance device 9. Upon the opening of the circuit breaker 12, the flow of ground fault current from system 5 to system 8 is stopped, thus leaving the reactance device 9 free to extinguish the ground fault arc. As soon as this is accomplished, the auxiliary relay 26 will become de-energized to close its contacts 28 and thereby energize the relay 25 to close its contacts 27. Since the auxiliary switch contacts 16 were closed upon the opening of the circuit breaker 12, the circuit of the closing coil 14 is now completed and the circuit breaker 12 will be reclosed to re-establish the connection between the two systems.

So far I have described an arrangement for operation on the occurence of a ground fault on the system 8 but an arrangement for automatically rendering the tie line non-conductive on the occurrence of a ground fault on the system 5 may be provided also, as shown in Fig. 2, although in some cases, the tie line may not be so controlled. Thus, I may provide a directional relay 190 so connected as to close its contacts 200 on the occurrence of ground fault current flow from the system 8 to the system 5. This relay may have its current winding 210 energized from current transformers 220 connected in the tie line 11 and having their secondaries connected in parallel to obtain a current proportional to the ground fault current, as is well-known to the art. The polarizing winding 230 may be connected across an auxiliary transformer 30 in the connection to ground from the neutral 7.

For reclosing the circuit breaker 12 when the ground fault disappears from the system 5, I may provide suitable additional auxiliary relays 250 and 260 which operate in a manner analagous to the relays 25 and 26, as described in connection with Fig. 1, with the exception that the relay 260 has its winding connected across the auxiliary transformer 30 and the contacts 270 of the auxiliary relay 250 are arranged in series with the contacts 27 of the auxiliary relay 25 so that the circuit breaker cannot be closed unless both systems are clear of ground faults. The circuit breaker may be provided with additional auxiliary switch contacts 31 arranged in series with the circuit of the winding of the auxiliary relay 260. The operation of this embodiment of my invention will be obvious from the explanation of the embodiment of my invention shown in connection with Fig. 1. It will also be clear that in case a ground fault occurs anywhere on the system 5 as in a branch feeder circuit of the system 5, the ground fault directional relay 190 will operate in the same manner. Of course, when the ground fault is removed by the ground fault protective relay (not shown) on the system 5 itself, the reclosing of the circuit breaker 12 will be effected.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United State is:

1. In combination, two electric systems each having a grounded neutral, a tie line interconnecting said systems for exchange of power, means responsive to a ground fault on one of said systems accompanied by ground fault current flow from the other system through said tie line to said one system for rendering said tie line nonconductive, and means effective after the disappearance of the ground fault for re-establishing the conductivity of said tie line.

2. In combination, two electric systems each having a grounded neutral, arc-suppressing inductive reactance means in one of said systems for suppressing an arc to ground from a system conductor, a tie line interconnecting said systems for exchange of power, and means responsive to a ground fault on said one of said systems for rendering said tie line nonconductive.

3. In combination, two electric systems each having a grounded neutral, arc-suppressing inductive reactance means in one of said systems for suppressing an arc to ground from a system conductor, a tie line interconnecting said systems for exchange of power, means responsive to a ground fault on said one of said systems accompanied by ground fault current flow from the other system through said tie line to said one system for rendering said tie line nonconductive, and means effective after the disappearance of said ground fault for re-establishing the conductivity of said tie line.

4. In combination, two electric systems, one of said systems having a grounded neutral and the other of said systems having a grounded arc suppressing inductive reactance means to suppress the ground fault current of the system on the occurrence of a ground fault thereon, a tie line interconnecting said systems for exchange of power, circuit interrupting means in said tie line, and means for effecting the opening of said circuit interrupting means on the occurrence of a ground fault on said other system including a directional relay connected to be energized in accordance with the flow of ground fault current in said tie line.

5. In combination, two electric systems, one of said systems having a grounded neutral and the other of said systems having a grounded arc suppressing inductive reactance means to suppress the ground fault current of the system on the occurrence of a ground fault thereon, a tie line interconnecting said systems for exchange of power, circuit interrupting means in said tie line, means for effecting the opening of said circuit interrupting means on the occurrence of a ground fault on said other system including a directional relay connected to be energized in accordance with the flow of ground fault current in said tie line, and means for reclosing said circuit interrupting means after the disappearance of the ground fault on said other system.

6. In combination, two electric systems, one of said systems having a neutral grounded through an impedance and the other of said systems having a neutral grounded through an arc-suppressing inductive reactance means proportioned to suppress the charging current to ground of the system on the occurrence of a ground fault thereon, a tie line interconnecting said systems for exchange of power, circuit interrupting means in said tie line, and means for effecting the opening of said circuit interrupting means on the occurrence of a ground fault on one of said systems including ground fault directional relay means connected to be energized in accordance with the flow of ground fault current in said tie line.

7. In combination, two electric systems, one of said systems having a neutral grounded through an impedance and the other of said systems having a neutral grounded through an arc-suppressing inductive reactance means, proportioned to suppress the charging current to ground of the system on the occurrence of a ground fault thereon, a tie line interconnecting said systems for exchange of power, circuit interrupting means on said tie line, and means for effecting the opening of said circuit interrupting means on the occurrence of a ground fault on one of said systems including ground fault directional relay means connected to be energized in accordance with the flow of ground fault current in said tie line, and means for reclosing said circuit interrupting means after the disappearance of the ground fault.

KOMAO FUKUSHIMA.